(12) United States Patent
Garza et al.

(10) Patent No.: US 10,954,135 B2
(45) Date of Patent: Mar. 23, 2021

(54) SYSTEM AND METHOD OF PREPARING ALUMINUM SULFATE

(71) Applicant: Chameleon Industries, Inc., Mesquite, TX (US)

(72) Inventors: Faustino Ignacio Garza, Mesquite, TX (US); Jared Wayne Garza, Mesquite, TX (US); Jason Lamar Garza, Mesquite, TX (US)

(73) Assignee: Chameleon Industries, Inc., Mesquite, TX (US)

( * ) Notice: Subject to any disclaimer, the term of this patent is extended or adjusted under 35 U.S.C. 154(b) by 0 days.

(21) Appl. No.: 16/708,136

(22) Filed: Dec. 9, 2019

(65) Prior Publication Data

US 2020/0115251 A1    Apr. 16, 2020

Related U.S. Application Data

(63) Continuation-in-part of application No. 16/706,342, filed on Dec. 6, 2019, which is a continuation-in-part of application No. 16/676,060, filed on Nov. 6, 2019, which is a continuation-in-part of application No. 16/035,189, filed on Jul. 13, 2018, now Pat. No. 10,501,330.

(51) Int. Cl.
      *C01F 7/74*         (2006.01)
(52) U.S. Cl.
      CPC ............. *C01F 7/743* (2013.01); *C01F 7/74* (2013.01)
(58) Field of Classification Search
      CPC .. C01F 7/74; C01F 7/743; C01F 7/745; C01B 17/69; B01D 2251/506; B01J 19/00; B01J 19/18; B01J 2219/00002
      See application file for complete search history.

(56) References Cited

U.S. PATENT DOCUMENTS

| 5,356,602 A | 10/1994 | Tanjo et al. |
| 5,622,697 A | 4/1997 | Moore, Jr. |
| 5,942,199 A | 8/1999 | Jokinen et al. |
| 7,067,099 B2 | 6/2006 | Inagaki |
| 7,360,550 B2 | 4/2008 | Inagaki |
| 2006/0144446 A1* | 7/2006 | Inagaki ................... C01B 17/69 137/561 R |

FOREIGN PATENT DOCUMENTS

| CN | 1843926 A | * 10/2006 | ................ C01F 7/74 |
| CN | 110615456 A | * 12/2019 | ................ C01F 7/74 |
| JP | 03164426 A | * 7/1991 | ................ C01F 7/74 |
| WO | 2003084868 A1 | 10/2003 | |

* cited by examiner

*Primary Examiner* — Timothy C Vanoy
(74) *Attorney, Agent, or Firm* — Braxton Perrone, PLLC; Celina M. Orr; Gregory Perrone (57) ABSTRACT

A system and method for processing a sulfuric acid waste output for the preparation of aluminum sulfate comprises providing a sulfuric acid waste output at a manufacturing facility and feeding the output into an onsite system of preparing aluminum sulfate at the manufacturing facility. The sulfuric acid waste output may be fed into an onsite system for preparing aluminum sulfate either directly after its production as a byproduct output or after onsite storage of the output. By combining a water solution with the sulfuric acid waste output prior to adding an alumina-containing compound to the combined solution to form aluminum sulfate, the sulfuric acid waste output is safely converted into a useful output without the need for transport offsite.

19 Claims, 5 Drawing Sheets

SYSTEM AND METHOD OF PREPARING ALUMINUM SULFATE

CROSS-REFERENCE TO RELATED APPLICATION

This application is a continuation-in-part of U.S. patent application Ser. No. 16/706,342 filed Dec. 6, 2019, which is a continuation-in-part of U.S. patent application Ser. No. 16/676,060 filed Nov. 6, 2019, which is a continuation of U.S. patent application Ser. No. 16/035,189 filed Jul. 13, 2018. All technical disclosures of these applications are herein incorporated by reference.

BACKGROUND OF THE INVENTION

Technical Field

The present invention relates generally to methods of preparing aluminum sulfate; and more specifically, to methods of preparing aluminum sulfate using sulfuric acid.

History of Related Art

Sulfuric acid is a basic raw material used in a wide variety of manufacturing processes and industries including, for example, the production of phosphate fertilizers, paper, inorganic pigment, and industrial organic chemicals. In the production of liquid aluminum sulfate, virgin or highly concentrated sulfuric acid (i.e., 93-98%) is typically first reacted with aluminum hydroxide and heated prior to dilution with water and cooling steps to obtain liquid aluminum sulfate.

$$2Al(OH)_3 + 3H_2SO_4 \rightarrow Al_2(SO_4)_3 + 6H_2O$$

The use of sulfuric acid solutions other than virgin sulfuric acid in the above method provides for incorporation of only small amounts (≤10%) of sulfuric acid solutions having concentrations less than 93%.

SUMMARY

There is a need for a method that provides for use of a substantial amount of a sulfuric acid solution other than virgin sulfuric acid for the production of aluminum sulfate.

Below is a simplified summary of this disclosure meant to provide a basic understanding of the method(s) described herein. This is not an exhaustive overview and is not intended to identify key or critical elements or to delineate the scope of the description. Its sole purpose is to present some concepts in a simplified form as a prelude to the more detailed description below.

In one aspect, the present disclosure relates to a method for processing a sulfuric acid waste output, the method comprising the steps of: providing a sulfuric acid waste output at a manufacturing facility; and feeding the sulfuric acid waste output into an onsite system of preparing aluminum sulfate at the manufacturing facility. In certain embodiments, the sulfuric acid waste output comprises no more than about 90% sulfuric acid. In certain embodiments, the feeding step comprises directing the sulfuric acid waste output directly into a vessel of the onsite system. In certain embodiments, the method comprises a step of storing the sulfuric acid waste output prior to the feeding step.

In one aspect, the present disclosure relates to a method of preparing aluminum sulfate, the method comprising the steps of feeding a sulfuric acid waste output into a mixing vessel, the mixing vessel comprising access to a water solution; combining the water solution with the sulfuric acid waste output in the mixing vessel; mixing the water solution and the sulfuric acid waste output to form a mixed solution; and adding an alumina-containing compound to the mixed solution to form aluminum sulfate.

In some embodiments, the water solution may comprise between about 10% and about 100% water. In some embodiments, prior to the combining step, the sulfuric acid solution comprises no more than about 75% sulfuric acid. In some embodiments, prior to the combining step, the sulfuric acid consists of sulfuric acid, hydrogen peroxide, and water. In any embodiment described herein, the concentration of the sulfuric acid of the mixed solution is between about 10% and about 85%. In some embodiments, the concentration of the sulfuric acid of the mixed solution is between about 50% and about 85%. In some embodiments, the mixing step comprises a step of adding at least one of virgin sulfuric acid and water to form the concentration of sulfuric acid in the mixed solution. In any embodiment, the alumina-containing compound comprises one of aluminum hydroxide and aluminum bauxite.

In some embodiments, the mixing step is performed continuously throughout the combining, mixing, and adding steps. In some embodiments, the adding step is performed at a temperature of at least about 150° F. In any embodiment, the method further comprises a step of maintaining a pH of the heated solution to less than about 2.0. In some embodiments, the method comprises a step of adding water to the aluminum sulfate to obtain a specific gravity of less than about 1.36. In some embodiments, the method may comprise a step of cooling the aluminum sulfate. In some embodiments, the method may comprise a step of filtering the aluminum sulfate. In some embodiments, the method comprises the step of adding a subsequent sulfuric acid solution having less than 90% sulfuric acid to the aluminum sulfate to form acidified aluminum sulfate.

In one aspect, the present disclosure relates to a system of preparing aluminum sulfate, the system comprising: a sulfuric acid waste output of a manufacturing facility in communication with a mixing vessel at the manufacturing facility, said mixing vessel comprising a rotatable shaft; an impeller attached to the rotatable shaft; a motor connected to the rotatable shaft; a first tank in communication with the mixing vessel, the first tank comprising a water solution; a second tank in communication with the mixing vessel, the second tank comprising an alumina-containing compound.

Other aspects, embodiments, and features of this disclosure will become apparent in the following written description and accompanying drawings.

BRIEF DESCRIPTION OF THE DRAWINGS

The novel features believed characteristic of the invention are set forth in the appended claims. The invention itself, however, as well as further objectives and advantages thereof, will be best understood by reference to the following detailed description of illustrative embodiments when read in conjunction with the accompanying drawings, wherein:

FIG. 2C depicts a top view of the embodiment shown in FIG. 2a.

DETAILED DESCRIPTION

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 1:
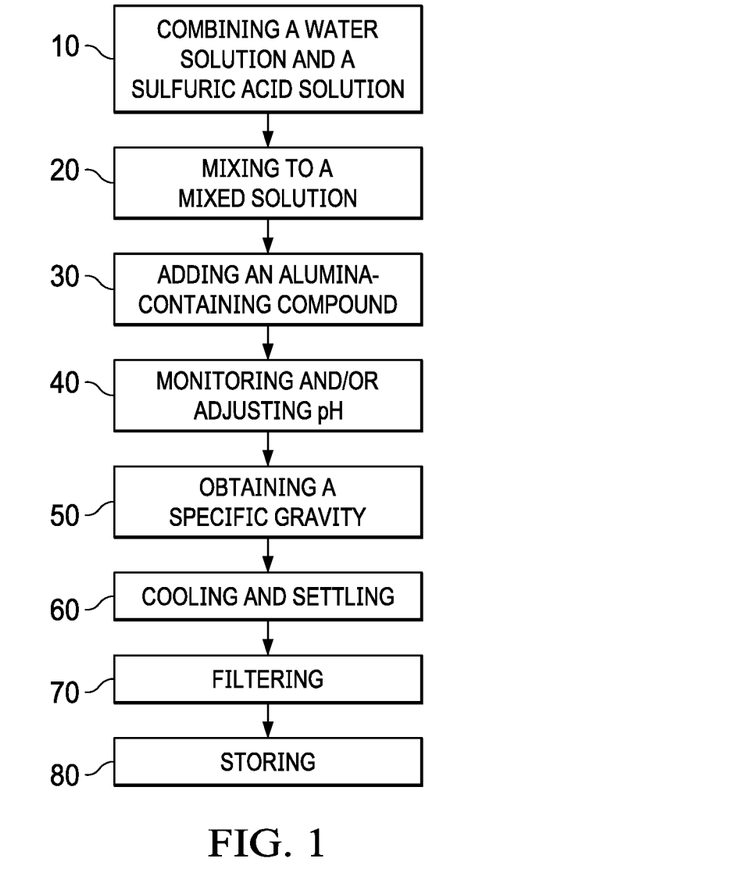
FIG. 1 is a flowchart of one embodiment of the method described herein.

FIG. 1 is a perspective view of one embodiment of a method described herein for processing a sulfuric acid solution for the preparation of liquid aluminum sulfate. A water solution and a sulfuric acid solution are first combined 10 in a mixing device or vessel. In some embodiments, the water solution comprises at least about 10% water. In some embodiments, the water solution comprises at least about 25% water. In some embodiments, the water solution comprises at least about 50% water. Water, as used herein and described throughout this method, generally refers to pure, deionized and/or tap water, whether hard water or soft water. In some embodiments, the water may comprise room or ambient temperatures of between about 60-75° F., for example. However, water outside these temperatures may also be used. In some embodiments, suitable water is potable.

In some embodiments, the water solution comprises between about 10% and about 100% water. In some embodiments, the water solution comprises between about 15% and about 100% water. In some embodiments, the water solution comprises between about 20% and about 98% water. In some embodiments, the water solution comprises between about 25% and about 95% water. In some embodiments, the water solution comprises between about 50% and about 90% water. In some embodiments, the water solution substantially comprises water. In some embodiments, the water solution consists of water. In some embodiments, the method is repeated such that a small amount of the alumina-containing compound from previous batch preparations is present during a combining step, further described below. In some embodiments, the water solution comprises no more than about 5% alumina-containing compound. In some embodiments, the water solution comprises no more than about 2% alumina-containing compound.

The sulfuric acid solution combined with water is a non-virgin sulfuric acid solution; that is, a sulfuric acid solution comprising no more than 90% sulfuric acid. In some embodiments, prior the combining step 10, the sulfuric acid solution comprises no more than about 80% sulfuric acid. In some embodiments, prior the combining step 10, the sulfuric acid solution comprises no more than about 75% sulfuric acid. In some embodiments, the sulfuric acid solution comprises no more than about 65% sulfuric acid. In some embodiments, the sulfuric acid solution comprises no more than about 60% sulfuric acid. In some embodiments, the sulfuric acid solution comprises between about 60% and about 75% sulfuric acid. In some embodiments, the sulfuric acid solution comprises between about 65% and about 70% sulfuric acid. In some embodiments, the sulfuric acid solution comprises between about 60% and about 70% sulfuric acid.

Generally, the sulfuric acid solution to be combined with the water in the combining step 10 comprises sulfuric acid and water. In certain embodiments, prior to the combining step 10, the sulfuric acid solution also comprises hydrogen peroxide. Hydrogen peroxide may be present in an amount up to about 20% by weight of the sulfuric acid solution prior to the combining step 10. In some embodiments, the sulfuric acid solution comprises at least 0.1% to about 6% hydrogen peroxide. In some embodiments, the sulfuric acid solution comprises at least 0.5% to about 6% hydrogen peroxide. In some embodiments, the sulfuric acid solution comprises at least 1.0% to about 6% hydrogen peroxide. In some embodiments, the sulfuric acid solution comprises between about 2% to about 4% hydrogen peroxide. In some embodiments, the sulfuric acid solution comprises between about 3% to about 4% hydrogen peroxide. In some embodiments, the sulfuric acid solution consists of sulfuric acid, hydrogen peroxide, and water. Thus, in certain embodiments, the sulfuric acid solution to be combined in the step 10 is free of metal. In all embodiments described herein, the aluminum sulfate produced using the method described herein is free of nitric acid, and all components and steps are free of nitric acid. In some embodiments, the sulfuric acid solution comprises between about 10% to about 50% water. In some embodiments, the sulfuric acid solution comprises between about 15% to about 45% water. In certain embodiments, the sulfuric acid solution comprises between about 19% to about 38% water. Suitable sulfuric acid solutions for the combining step 10 may be prepared or obtained, for example, as sulfuric acid waste from any number of industrial processes.

Returning to the discussion of FIG. 1, in certain embodiments, the combining step 10 comprises simultaneous adding of the sulfuric acid solution and the water solution into a single mixing device or vessel, an embodiment of which will be further described below. In other embodiments, the combining step may be performed by sequentially adding the water solution and the sulfuric acid solution, in no particular order. In such embodiments, the combining step may further comprise alternately or intermittently adding the water solution and the sulfuric acid solution any number of times after adding a portion of the sulfuric acid solution to the water.

With reference to FIG. 1, following the combining step 10, the method comprises the step of mixing 20 the water solution and the sulfuric acid solution to form a mixed solution comprising a concentration of sulfuric acid of between about 10% and about 85%. In certain embodiments, the mixed solution comprises a concentration of sulfuric acid of between about 50% to about 85%. In certain embodiments, the mixed solution comprises a concentration of sulfuric acid of between about 10% and about 50%. In certain embodiments, the mixed solution comprises a concentration of sulfuric acid of between about 10% and about 75%. In certain embodiments, the mixed solution comprises a concentration of sulfuric acid of between about 15% and about 65%. In certain embodiments, the mixed solution comprises a concentration of sulfuric acid of between about 55% to about 80%. In certain embodiments, the mixed solution comprises a concentration of sulfuric acid of between about 60% to about 80%. In certain embodiments, the mixed solution comprises a concentration of sulfuric acid of between about 10% and 35%. In some embodiments, the mixed solution comprises a concentration of sulfuric acid of between about 15% and about 25%.

In attaining the proper concentration of sulfuric acid in the mixed solution, the mixing step 20 may further comprise a step of adding at least one of: virgin sulfuric acid and water as the mix is being stirred by the agitator blades. The term "virgin sulfuric acid," as used herein, is meant to refer to a sulfuric acid solution comprising a concentration of sulfuric acid of 90% or more. Adding virgin sulfuric acid helps increase the temperature of the mixed solution to about 175° F. in some embodiments, which may speed promotion of the reaction. Such additions may take place simultaneously or sequentially in no particular order. In some embodiments, the sulfuric acid solution may be combined with a virgin sulfuric acid prior to the combining step 10. In certain embodiments, a ratio of about 50:50 virgin and non-virgin sulfuric acid, for example, may be combined with and mixed with the water. However, other embodiments of the sulfuric acid solution and the mixed solution are free of virgin sulfuric acid and comprise 100% of the non-virgin sulfuric acid solution described above.

In certain embodiments, the combining step 10 and the mixing step 20 may be performed sequentially. In some embodiments, the combining step 10 and the mixing step 20 may be performed simultaneously. Some embodiments may also comprise intermittent mixing steps to form the mixed solution.

The combining 10 and/or mixing 20 steps may take place for time period of over 20 to about 60 minutes, in some embodiments, depending on the initial sulfuric acid concentration of the solution prior to combining 10. Mixing 20 should generally be performed at a speed of between about 15 rpm to about 50 rpm, depending on timing and concentrations used. In some embodiments, the mixing is performed at between about 25 rpm and about 31 rpm. In some embodiments, the mixing step is performed at between about 26 rpm to about 30 rpm. In some embodiments, the mixing step is performed at between about 28 rpm to about 29 rpm. Inadequate mixing produces too much settling on the bottom. Conversely, if too high, undesirable waves will result in the mixing vessel. In some embodiments, the mixing step 20 is performed continuously throughout the combining 10, mixing 20, and adding steps.

Figure 2A:
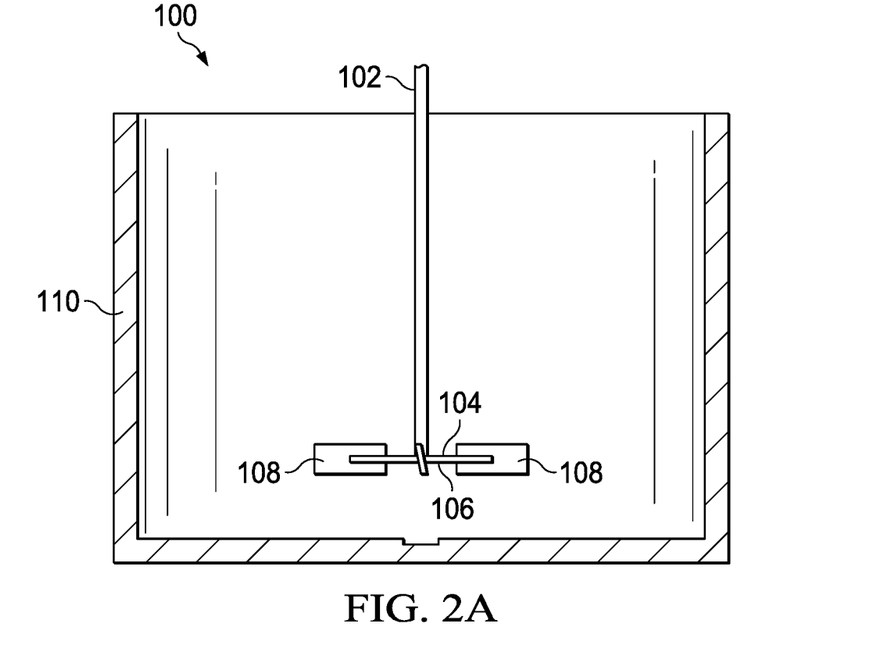
FIG. 2A depicts one embodiment of a mixing device and agitator blade used for mixing.
Figure 2B:
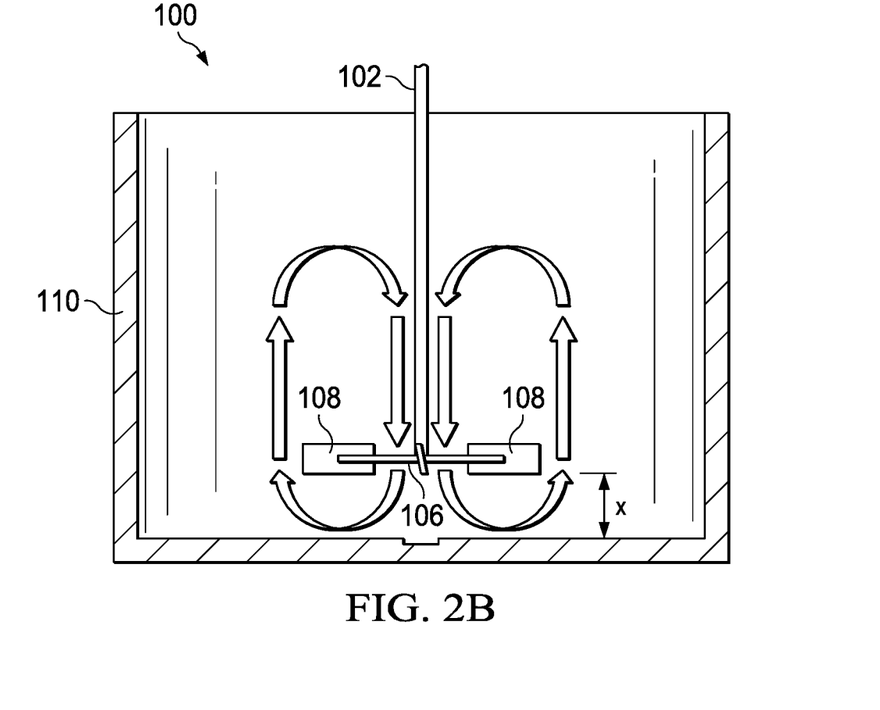
FIG. 2B depicts a side view of the embodiment shown in FIG. 2*a*.
Figure 2C:
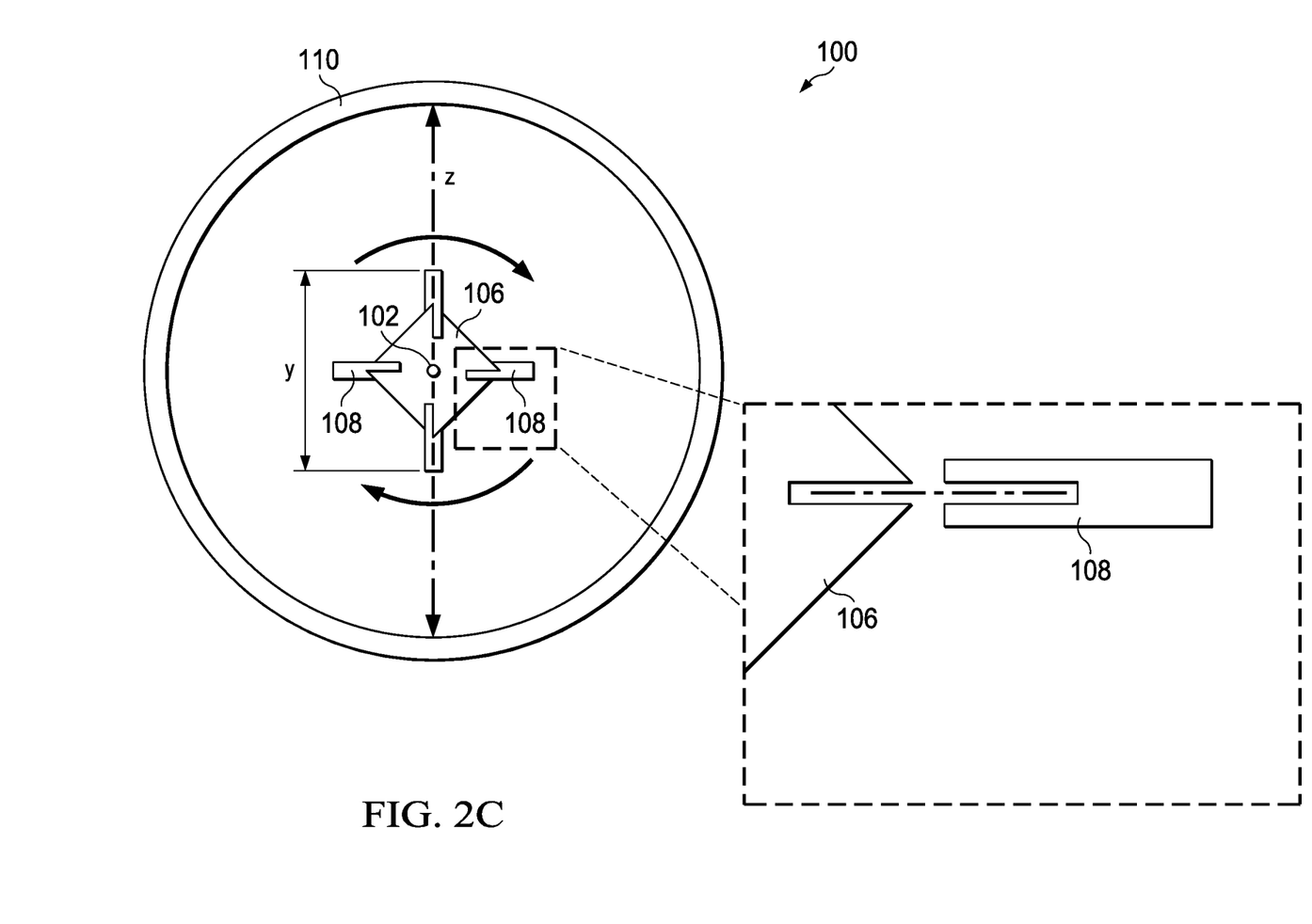

FIGS. 2A-2C illustrate one embodiment of a suitable mixing device 100. FIG. 2A is a cross-section view of a vessel or tank 110 of the mixing device 100 comprising a rotating shaft 102 within the tank 110, the rotating shaft 102 comprising an impeller 104 on an end near the bottom of the tank 110. The impeller comprises a plate 106 and a plurality of agitator blades 108 extending from the plate 106. For clarity, FIG. 2A depicts only two of the four blades 108 of the embodiment shown therein. The plate 106 is connected or mounted perpendicular to the rotating shaft 102. The plate may comprise a hole in its center for the shaft. The shaft 102 may comprise, for example, a diameter of about 2.25 to about 2.5 inches. By way of example, the plate may comprise a square shape with each side about 2 feet long and about 2 feet wide. Other shapes may be possible so long as an axial flow of the component(s) within the mixing vessel is accomplished during mixing.

In some embodiments, the impeller comprises an even number of agitator blades 108. In certain embodiments, the blades are mounted at an angle extending from an upper left to a lower right. The blades 108 may be mounted at an angle of between about 10° to about 80° with respect to the horizontal axis of the plate 106. In some embodiments, the blades 108 are mounted at an angle of between about 20° to about 70°. In some embodiments, the blades 108 are mounted at an angle of between about 30° to about 60°. In some embodiments, an even number of blades 108 are mounted at an angle of about 45° from the upper left to the lower right.

In some embodiments, each corner of the plate 106 may comprise a slot or slit for each blade 108, the slot comprising a length sufficient to engage with a corresponding slot of a blade 108, as best shown in FIG. 2c. Each blade 108 may be inserted and welded into a slot at a corner of the plate 106 via a corresponding slot in the blade 108, the corresponding slot of the blade 108 located midway between one end of a width of the blade. While FIG. 2C shows the slots fully extending out to a perimeter of each of the plate and the blade, other fits may be possible so long as the plate and connected blades form a solid bond.

The distance x from the bottom of the tank 110 to the blades 108 of the impeller is from about 0.5 times the diameter y of the impeller to about 2.0 times the impeller diameter y. In some embodiments, the distance x ranges from about 0.67 to 1.3 times the diameter of the impeller. As shown in the embodiment depicted in FIGS. 2A-2C, four flat rectangular blades 108 are attached to the square plate 106. In some embodiments, each blade 108 comprises an aspect ratio ranging from about 4:3 to about 2:1. For example, when a blade 108 comprises a width of about ten inches and a length of about 20 inches, a corresponding slot on the blade 108 is located on the center of the width of the blade, with about 5 inches on either side of the corresponding slot on the blade. The diameter y of the impeller 104 is about 0.25 to about 0.5 times the inner diameter z of the tank 110. In some embodiments, the diameter y of the impeller is about ⅓ of the inner diameter z of the tank 110. The mixing step thus described herein creates an axial flow pattern between the liquids, which pulls fluid from the top center of the tank and down along the shaft 102 towards the center bottom of the tank, as shown in FIG. 2B. The fluid then flows along the bottom toward and then up the outside walls. This keeps the corrosive acid from collecting at the top or coming in direct contact with the walls of the tank, while promoting the formation of aluminum sulfate, as described below. As shown in FIG. 2C, the fluid rotates in a clockwise direction in some embodiments.

Returning to the discussion of FIG. 1, once a mixed solution is formed, an alumina-containing compound is added 30 to the mixing device, initiating the formation of aluminum sulfate. Suitable alumina-containing compound may comprise aluminum hydroxide and aluminum bauxite, for example. In some embodiments, the alumina-containing compound comprises aluminum hydroxide. In some embodiments, the alumina-containing compound consists of aluminum hydroxide. In some embodiments, the alumina-containing compound comprises aluminum bauxite. In some embodiments, the alumina-containing compound consists of aluminum bauxite. Other suitable alumina-containing compounds may also be possible in some embodiments.

Generally, the adding step 30 is performed in a controlled manner over a period of time sufficient to allow the mixed solution to reach a temperature of at least about 175° F., at which point the alumina-containing compound and the mixed solution begin to react to form aluminum sulfate. In some embodiments, the adding step is performed once the mixed solution reaches a temperature of at least about 150° F. When the adding step is performed, the temperature of the mixed solution will further rise forming what is referred to herein as a heated solution. In some embodiments, the heated solution reaches a temperature of at least about 175° F. In some embodiments, the heated solution reaches a temperature of between about 175° F. and about 225° F. In some embodiments, the heated solution reaches a temperature of at least about 200° F. In some embodiments, the heated solution reaches a temperature of between about 200° F. and about 220° F. In some embodiments, the heated solution reaches a temperature of between about 200° F. and about 210° F.

The time duration of the adding step may depend on the volume of the mixed solution. In some embodiments, the adding step 30 is performed for at least about 2 hours at a feeding rate of between about 150 to about 250 lbs/minute. In some embodiments, the adding step 30 comprises a rate of between about 160 and about 220 lbs/minute. In some embodiments, the adding step 30 comprises a rate of between about 170 and about 200 lbs/minute. In some embodiments, the adding step is performed for between about 2 hours to about 3 hours. Adding 30 may comprise continuous feeding in some embodiments. In other embodiments, adding 30 may comprise intermittent feeding of the alumina-containing compound to the mixing device or vessel. A combination of continuous and intermittent feeding is also possible in some embodiments. Further, in some embodiments, where desirable, the adding step may comprise the adding of an amount of the alumina-containing compound sufficient to form acidified aluminum sulfate.

During the adding step 30, mixing step 20 should continue to be performed, whether simultaneous or intermittently at speeds as recited above. When the mixing speed is too high, heat transfer rates may increase along the walls, overcooling the solution and preventing it from achieving necessary temperatures for the reaction. Similarly, when speed is too low, the temperatures are too low, and the desired reaction is not promoted. In some embodiments, after adding 30, the method may comprise adding virgin sulfuric acid to increase or maintain the temperature to at least about 175° F. Water can also be added in some embodiments to cool the temperature to below about 225° F. The adding step 30 may partially overlap the combining 10 and/or mixing steps 20 in some embodiments. In some embodiments, the adding step 30 at least partly overlaps the combining step 10. In some embodiments, the adding step 30 at least partly overlaps the mixing step 20.

Once all the alumina-containing compound has been added 30, the combination forming a pH of 2.0 or less, the heated solution is then allowed to react over a time period of at least about 2 hours. During this period, the method further comprises a step of monitoring and maintaining a pH 40 of the heated solution (i.e., the mixed solution with the alumina-containing compound) to ensure a complete reaction between the sulfuric acid and the alumina-containing compound. The heated solution should comprise a pH of between about 1.6 and about 2.0 at this time. Thus, if necessary, the method may comprise a step of adjusting the pH. Adjusting pH may be performed by adding additional non-virgin sulfuric acid solution if the pH is too high. If the pH is low, more alumina-containing compound should be added. The specific gravity of the aluminum sulfate is generally about 1.38 after the monitoring step 40. The monitoring step 40 is performed for up to about 12 hours. In some embodiments, the monitoring step 40 is performed for less than about 4 hours. In some embodiments, the monitoring step 40 is performed for between about 2 hours and about 4 hours.

Once the pH is confirmed to be within the correct range, the method may further comprise the step of obtaining a specific gravity 50 of less than about 1.4. In some embodiments, once a specific gravity of less than about 1.36 is reached, the aluminum sulfate cools and settles overnight before filtering and/or storing steps. Optionally, step 50 can be performed by adding water to the aluminum sulfate to obtain the desired specific gravity. In some embodiments, water is added to obtain a specific gravity of between about 1.3 to about 1.38. In some embodiments, water is added to obtain a specific gravity of between about 1.34 to about 1.36.

Once the proper specific gravity is attained, the aluminum sulfate may be cooled 60. Cooling 60 may take place overnight, or for at least about 10 hours in some embodiments. In some embodiments, a cooling system may be used such as one including one or more of a cooling jacket, cooling liquid, or cooling air. Cooling 60 also allows the settling of the reacted solution. Cooling and settling may be performed overnight. In some embodiments, the cooling and setting steps may be performed for at least about 10 hours. In some embodiments, the cooling and setting steps may be performed for at least about 15 hours. After the cooling period 60, the aluminum sulfate is subjected to filtering 70, in some embodiments, and may then be stored 80, if desired. During filtering 70, in some embodiments, the aluminum sulfate may comprise the following physical properties at about 160° F. to about 180° F.:

TABLE 1

Physical properties of formed aluminum sulfate.

| | |
|---|---|
| Dry Alum in Solution: | 48-49% |
| $Al_2O_3$ | 8.0-8.4% |
| Free $Al_2O_3$ | +/−0.025% |
| Total Iron as $Fe_2O_3$ | <50 ppm |
| Insoluble Matter | <0.02% |
| Specific Gravity | 1.325 +/− 0.003 |
| pH | 1.8-2.5 |

It should be noted that embodiments comprising or consisting of aluminum bauxite may comprise additional processing steps to minimize the amount of residual solids leftover after the reaction takes place. By way of example and without limitation, in such embodiments, the method may comprise at least one round of additional settling of the reaction, pumping out aluminum sulfate, and the adding of water to recover leftover aluminum sulfate before any discarding of unrecoverable waste.

The methods described above to form aluminum sulfate further provides for the production of additional batches of aluminum sulfate in the same vessel. That is, in any of the embodiments of the methods forming aluminum sulfate, at least the mixing and the adding steps may be performed in a single vessel. After forming at least a first batch of aluminum sulfate, the method may further comprise the steps of removing formed aluminum sulfate and repeating combining, mixing, and adding steps in the vessel to form additional aluminum sulfate. Thus, once an amount of aluminum sulfate is produced, the aluminum sulfate may be collected or removed from the vessel and the vessel may again be used to perform one or more of steps of combining, mixing and/or adding, as described above. In certain embodiments, after forming aluminum sulfate, the method comprises the steps of removing the aluminum sulfate from the vessel; combining a subsequent water solution with a subsequent sulfuric acid solution; mixing the subsequent water solution with the subsequent sulfuric acid solution in the vessel to form a subsequent mixed solution; and adding a subsequent alumina-containing compound to the subsequent mixed solution to form additional aluminum sulfate.

In some embodiments, the subsequent water solution is the water solution used in a previous combining step. In some embodiments, the subsequent water solution may comprise between about 10% to about 100% water. In some embodiments, the subsequent water solution comprises at least about 10% water. In some embodiments, the subsequent water solution comprises at least about 25% water. In some embodiments, the subsequent water solution comprises at least about 50% water. In some embodiments, the subsequent water solution substantially comprises water. In some embodiments, the subsequent water solution comprises between about 15% and about 100% water. In some embodiments, the subsequent water solution comprises between about 20% and about 98% water. In some embodiments, the subsequent water solution comprises between about 25% and about 95% water. In some embodiments, the subsequent water solution comprises between about 50% and about 90% water. In some embodiments, the subsequent water solution consists of water.

In some embodiments, the subsequent sulfuric acid solution is the sulfuric acid solution used in a previous combining step. In some embodiments, the subsequent sulfuric acid solution comprises no more than 90% sulfuric acid prior to the combining step. In some embodiments, the subsequent sulfuric acid solution comprises no more than about 75% sulfuric acid prior to the combining step. In some embodiments, the subsequent sulfuric acid solution consists of sulfuric acid, hydrogen peroxide and water prior to the combining step.

As with the mixed solution discussed above, the concentration of sulfuric acid in the subsequent mixed solution may range from between about 10% to about 85%. In certain embodiments, the sulfuric acid in the subsequent mixed solution may range from between about 10% to about 75%. In certain embodiments, the sulfuric acid in the subsequent mixed solution may range from between about 15% to about 65%.

In some embodiments, the subsequent alumina-containing compound is the alumina-containing compound used in a previous adding step. In some embodiments, the subsequent alumina-containing compound comprises one of aluminum hydroxide and aluminum bauxite. Other sources of an alumina-containing compound may also be possible in certain embodiments.

While current methods of producing aluminum sulfate, which first react highly concentrated sulfuric acid with aluminum hydroxide, result in faster manufacturing times, it is believed that the method and system described herein is less volatile and less sensitive to the presence of a weaker sulfuric acid solution. Thus, the process is more forgiving and allows substantially all the sulfuric acid solution to be sourced from a non-virgin sulfuric acid as described herein. The method described herein is also not as aggressive as methods using only or substantially only virgin sulfuric acid, as the temperatures of the reactions described herein increase slowly and are easily maintained at the proper temperatures for the reaction to fully occur, leaving little residual solids to clean up. In some embodiments, the present method leaves substantially no (i.e., less than 1%) residual solids in the mixing vessel following the reaction. The method and system described herein is therefore also safer than currently used methods and provides for a simplified, cost effective way of making aluminum sulfate.

In some embodiments, the method described herein is free of any additional or external heating devices or systems including, by way of example, steam. Thus, the current method may rely entirely upon exothermic reactions and promoting the sulfuric acid and the alumina-containing compound to fully react in forming the aluminum sulfate in certain embodiments. In some embodiments, the method described herein may comprise an external heating method or source to force the reaction and formation of the aluminum sulfate.

The method provided herein also provides a source of aluminum sulfate that can be used in any number of industries. In some embodiments, the above-described method producing aluminum sulfate may comprise a step of adding a subsequent sulfuric acid solution having less than 90% sulfuric acid to the aluminum sulfate to form acidified aluminum sulfate. By way of example, the subsequent sulfuric acid solution may be added in an amount sufficient to produce between about 1% to about 15% free acid by weight when combined with the aluminum sulfate.

Figure 3:
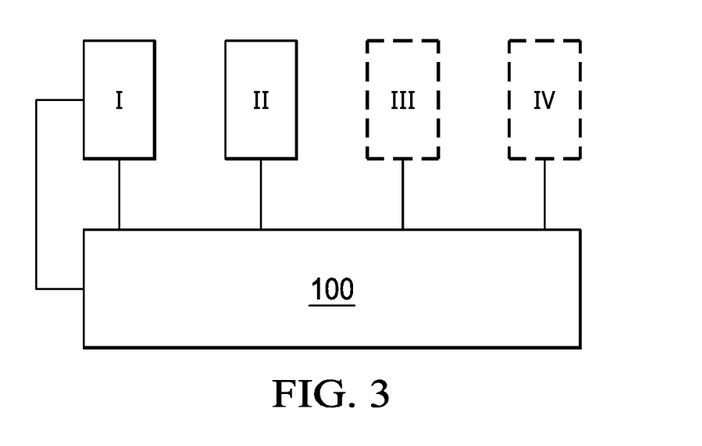
FIG. 3 depicts one embodiment of a system described herein.

FIG. 3 depicts a system of making aluminum sulfate. The system of making aluminum sulfate described herein comprises at least a first vessel or tank I and a second vessel or tank II in communication with a single mixing device or vessel 100. At least one of the first tank and the second tank is in communication with both a top half of the mixing device and a bottom half of the mixing device. By way of example, FIG. 3 depicts the first tank I in communication with both the top and bottom halves of the mixing device 100. The first tank I may comprise or consist of, for example, the water or a water solution, while the second tank II may consist of the non-virgin sulfuric acid, described above. Any number of transportation systems used for fluids such as one or more pipes and one or more pumps may be used to allow that each tank be in communication with the mixing device 100. As described above in relation to FIGS. 2A-2C, the mixing device 100 comprises an inner diameter and a hollow opening having a rotatable shaft within the hollow opening. The rotatable shaft extends into the hollow opening and comprises an impeller near a bottom wall of the mixing device 100. Further details of the mixing device and its impeller are described above in relation to FIGS. 2A-2C.

In some embodiments, the system further comprises a third vessel or tank III in communication with the single mixing vessel 100. In additional embodiments, the system further comprises a fourth vessel or tank IV. Tanks III and IV are shown in dashed lines in FIG. 3. The third tank III may comprise, for example, virgin sulfuric acid for mixing to the desired concentration and/or for ensuring complete formation of aluminum sulfate after the adding step. Alternatively, the third tank III may comprise the alumina-containing compound to allow for the adding or feeding of the alumina-containing compound to the mixed solution within the mixing device 100. In some embodiments, a fourth tank IV may be in communication with the mixing device 100. The fourth tank IV may comprise, for example, the alumina-containing compound when virgin sulfuric acid is desired for use with the system. Similar to the first and second tanks, either of the third or fourth tank having an additional liquid, may communicate with the mixing device 100 via a pipe or pumping system suitable for use with liquid. The tank III or IV, when comprising the alumina-containing compound, is in communication with the mixing device 100 via any number of transporting systems suitable for powder materials, including without limitation a conveyor belt, a screw auger, or a pneumatic pumping system.

The mixing device 100 comprises a rotatable shaft, an example of which is described above and shown in FIGS. 2A-2C, provides for mixing of the components added to the mixing device 100. The rotatable shaft is further in communication with a motor to control mixing speed of the mixing device.

In some embodiments, components of one or more of the first tank, second tank, third tank, and fourth tank may be fed directly into or near the top of the mixing device 100. In addition, at least one tank is in communication with or near a bottom half of the mixing device 100. In certain embodiments, any of the tanks I-IV comprising water may also be fed into or near the bottom of the mixing device 100. As shown by way of example in FIG. 3, tank I is in communication with both the top half and the bottom half of the mixing vessel. In this manner, as described above, tank I may comprise water, which may be added to the mixing device in forming the mixed solution, or to the adding step of the method to help adjust the temperature of the heated solution in forming the aluminum sulfate. The mixing device 100 described in detail in relation to FIGS. 2A-2C, may further be in communication with a filter. As described above, the system of the present disclosure may be free of any heating devices in some embodiments.

Figure 4:
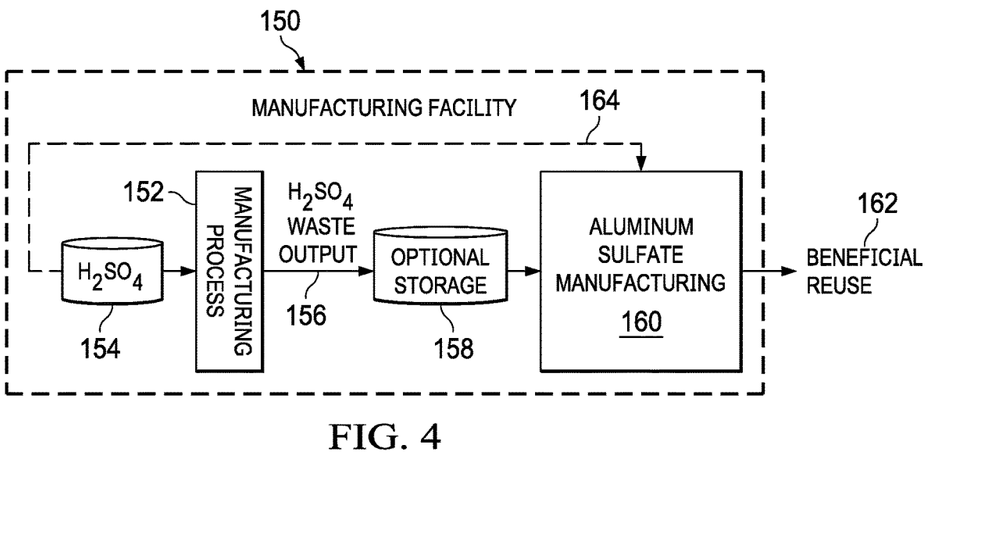
FIG. 4 depicts one embodiment of a method described herein.

The methods described herein allow for a method and system of on-site treatment of a sulfuric acid waste output comprising no more than about 90% sulfuric acid into a desirable output that is much safer to then store and/or transfer. FIG. 4 illustrates a manufacturing facility 150 in which a manufacturing process 152 utilizing sulfuric acid 154 takes place. The sulfuric acid 154 may be combined with any number of other chemicals in some embodiments, producing a sulfuric acid waste output 156. The waste output 156 may be optionally stored 158, or it may be directly sent to an onsite aluminum sulfate manufacturing system or process 160, as described herein, at or attached to the manufacturing facility. In some embodiments, the aluminum sulfate manufacturing process is directly in line with the sulfuric acid waste output. Thus, as reflected in FIG. 4, the method comprises the steps of providing a sulfuric acid waste output at a manufacturing facility; and feeding the sulfuric acid waste output into an onsite system of preparing aluminum sulfate at the manufacturing facility. A sulfuric acid tank or supply source 154 may be in communication with the aluminum sulfate manufacturing system in some embodiments.

As used herein, "a sulfuric acid waste output" solution refers to a sulfuric acid by-product solution or stream produced by a manufacturing process. As used herein, a "manufacturing facility" refers to any facility operated for the purpose of manufacturing goods. In some embodiments, by way of example, the manufacturing facility manufactures semiconductors. An "onsite" system or structure refers to a system or structure situated at or adjacent to the location where a byproduct or output is produced, including a system or structure immediately adjacent to a manufacturing process or facility such that no intervening off-site truck transport or transfer of the waste output is necessary prior to its useful conversion into aluminum sulfate. In some embodiments, the system disclosed herein comprises a piping system (i.e., one or more pipes) for piping or feeding a sulfuric acid waste output into an adjacent aluminum sulfate manufacturing facility.

In some embodiments, the providing step comprises producing the sulfuric acid waste output at the manufacturing facility. In some embodiments, the providing step comprises the maintaining or storing for a sulfuric acid waste output at the manufacturing facility. Feeding may comprise, for example, one or more of: pumping, pouring, sending, discharging, piping, or otherwise transferring the sulfuric acid waste output into a mixing vessel of an onsite system of preparing aluminum sulfate at the manufacturing facility. In some embodiments, the feeding step comprises intermittent feeding. In some embodiments, the feeding step comprises continuous, uninterrupted feeding for the production of aluminum sulfate. In certain embodiments, the sulfuric acid waste output comprises no more than about 90% sulfuric acid. In certain embodiments, the sulfuric acid waste output comprises no more than about 75% sulfuric acid. In certain embodiments, the sulfuric acid waste output consists of sulfuric acid, hydrogen peroxide, and water. In certain embodiments, the feeding step comprises directing the sulfuric acid waste output directly (i.e., without any intervening steps or equipment) into a vessel of the onsite system. In certain embodiments, the method comprises a step of storing the sulfuric acid waste output onsite prior to the feeding step.

An onsite manufacturing system as reflected in FIG. 4 provides a number of benefits. First, the system provides for beneficial reuse of an otherwise hazardous waste. Sulfuric acid waste is typically labeled a hazardous substance subject to various regulations for its safe disposal or removal. However, the method and system described herein effectively converts a hazardous waste into a beneficial output by producing a useful, sellable product. Second, the system removes the need for specialty equipment and travel times, while significantly reducing the need for human interaction to treat the sulfuric acid waste. Using the systems and methods described herein, a desirable product that is subsequently safer to handle and transport is obtained. Thus, manufacturing facilities using sulfuric acid would no longer need to transport the sulfuric acid waste off-site for either recycling via acid reclamation or disposal via neutralization. Off-site transport comes with numerous risks of spilling, contamination, and dangerous reactions that must be carefully handled and avoided or simply allowed to run its course when it does mistakenly occur. The onsite production of aluminum sulfate removes the need for specialty equipment, gear, and risky travel that is otherwise necessary for the disposal of sulfuric acid waste produced as waste.

Figure 5:
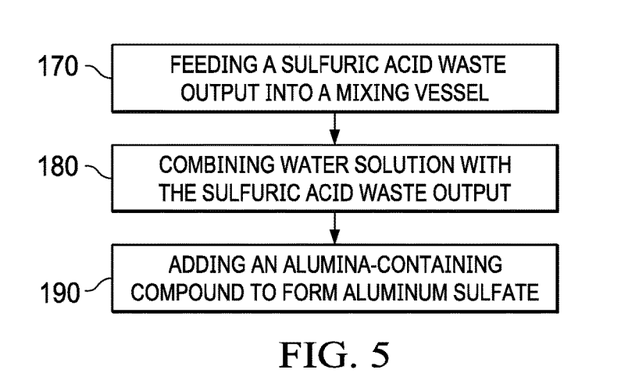
FIG. 5 is a flowchart of one embodiment of a method described herein.

FIG. 5 depicts a flowchart of one embodiment of a method of preparing liquid aluminum sulfate from a sulfuric acid waste output of a manufacturing process. The method comprises the steps of feeding a sulfuric acid waste output into a mixing vessel 170, the mixing vessel comprising access to a water solution, combining the water solution with the sulfuric acid waste output to form a mixed solution 180; and adding an alumina-containing compound to the mixed solution to form aluminum sulfate 190. A suitable mixing vessel is described above with relation to FIGS. 2A-2C and 3 and will be further described below.

The sulfuric acid waste output of the feeding step may comprise an additional chemical or substance together with the sulfuric acid, depending on the specific manufacturing process used in the manufacturing facility. In some embodiments, the sulfuric acid waste output comprises an amount of up to about 20% by weight hydrogen peroxide. In some embodiments, the sulfuric acid waste output of the feeding step comprises no more than about 90% sulfuric acid. In some embodiments, the sulfuric acid waste output of the feeding step comprises no more than about 75% sulfuric acid. In some embodiments, the sulfuric acid waste output of the feeding step consists of sulfuric acid, hydrogen peroxide, and water. In some embodiments, the sulfuric acid waste output comprises at least 0.1% to about 6% hydrogen peroxide. In some embodiments, the sulfuric acid solution comprises at least 0.5% to about 6% hydrogen peroxide. In some embodiments, the sulfuric acid waste output comprises at least 1.0% to about 6% hydrogen peroxide. In some embodiments, the sulfuric acid waste output comprises between about 2% to about 4% hydrogen peroxide. In some embodiments, the sulfuric acid waste output comprises between about 3% to about 4% hydrogen peroxide. In certain embodiments, the sulfuric acid waste output is free of metal.

Suitable water solutions in communication with the vessel include those described above in relation to FIG. 1. More specifically, a water solution for the preparation of aluminum sulfate from a sulfuric acid waste output comprises between about 10% and about 100% water. In some embodiments, the water solution comprises at least about 10% water. In some embodiments, the water solution comprises at least about 25% water. In some embodiments, the water solution comprises at least about 50% water. In some embodiments, the water solution comprises between about 15% and about 100% water. In some embodiments, the water solution comprises between about 20% and about 98% water. In some embodiments, the water solution comprises between about 25% and about 95% water. In some embodiments, the water solution comprises between about 50% and about 90% water. In some embodiments, the water solution substantially comprises water. In some embodiments, the water solution consists of water. In some embodiments, the mixing vessel comprises access to a water line such as one from the city or a well-watering system.

Combining the water solution with the sulfuric acid waste output 180 comprises any step necessary to form a mixed solution as described above. For example, the combining step may comprise simultaneous adding of the water solution and the sulfuric acid waste output into a single mixing device or vessel in some embodiments. Combining may also be performed by sequentially adding the water solution and the sulfuric acid waste output, in no particular order, in some embodiments. The combining step may further comprise alternately or intermittently adding the water solution and the sulfuric acid waste output any number of times in any order. In some embodiments, the combining step comprises mixing the water solution and the sulfuric acid waste output. Mixing is performed while combining in some embodiments. Mixing is performed after combining in some embodiments.

In some embodiments, the mixed solution comprises between about 10% and about 85% sulfuric acid. In some embodiments, the mixed solution comprises between about 50% and about 85% sulfuric acid. In some embodiments, the mixed solution comprises between about 10% and about 75% sulfuric acid. In some embodiments, the mixed solution comprises between about 15% and about 65% sulfuric acid. In attaining the proper concentration of sulfuric acid in the mixed solution, the mixing step may further comprise a step of adding at least one of: virgin sulfuric acid and water, as described above with reference to the method of FIG. 1.

Mixing comprises a speed of between about 15 rpm to about 50 rpm in some embodiments. In some embodiments, the mixing is performed at between about 25 rpm and about 31 rpm. In some embodiments, the mixing step is performed at between about 26 rpm to about 30 rpm. In some embodiments, the mixing step is performed at between about 28 rpm to about 29 rpm. By way of example, mixing may be performed in a mixing vessel as described above in FIGS. 2A-2C.

The adding of an alumina-containing compound 190 may be performed in a controlled manner when the mixed solution comprises a temperature of at least about 150° F. In any embodiment, the alumina-containing compound comprises one of aluminum hydroxide and aluminum bauxite. As the alumina-containing compound is added, the temperature of the mixed solution will increase, with formation of the aluminum sulfate occurring at temperatures of at least about 175° F. In some embodiments, at least one of the combining step and the adding step comprises heating the mixed solution or alumina-containing solution with a heating device to help achieve reaction temperatures. In some embodiments, the temperature of the adding step is controlled to within a range of between about 175° F. and about 225° F. In some embodiments, the temperature of the adding step is controlled to within a range of between about 200° F. and about 220° F. In some embodiments, the temperature of the adding step is controlled to within a range of between about 200° F. and about 210° F. The length of the adding step will vary, as above, depending on the volume of the mixed solution. Generally, a rate of between about 150 and about 250 lbs/minute is desirable. In some embodiments, the adding step comprises a rate of between about 160 and about 220 lbs/minute. In some embodiments, the adding step comprises a rate of between about 170 and about 200 lbs/minute. Adding may comprise continuous feeding in some embodiments. In other embodiments, adding comprises intermittent feeding of the alumina-containing compound to the mixing device or vessel. A combination of continuous and intermittent feeding is also possible in some embodiments. Where desirable, adding may comprise adding an amount of the alumina-containing compound sufficient to form acidified aluminum sulfate. During the adding step, mixing should continue to be performed at mixing speeds as described above. For example, adding comprises mixing at a rate of between about 150 and about 250 lbs/minute. In certain embodiments, after adding, virgin sulfuric acid may be added to increase or maintain temperatures to at least about 175° F. Alternatively, water may be added to cool the temperature to below about 225° F. in some embodiments.

Similar to the method described above in relation to FIG. 1, formation of aluminum sulfate from a sulfuric acid waste output may further comprise a step of monitoring a pH of the heated solution to about 2.0 or less. In some embodiments, the step of monitoring comprises monitoring or adjusting the pH to between about 1.0 to about 2.0. Monitoring of the pH may comprise a time period of between about 2 hours and up to about 12 hours and will depend on the volume of the sulfuric acid waste output introduced. After the monitoring period a specific gravity of the aluminum sulfate formed is generally less than about 1.4. In some embodiments, the specific gravity is between about 1.3 and about 1.38. In some embodiments, the specific gravity is between about 1.34 and about 1.36. In some embodiments, the method comprises cooling and settling steps as described above. In some embodiments, the method comprises a step of filtering the aluminum sulfate. Physical properties of formed aluminum sulfate are found above in Table 1.

In some embodiments, the method described herein comprises a step of monitoring a temperature within the mixing vessel. In some embodiments, the method described herein comprises a step of maintaining a temperature within the mixing vessel to at least about 175° F. In some embodiments, the method described herein comprises a step of maintaining a temperature within the mixing vessel to between about 175° F. and about 225° F. In some embodiments, the method described herein comprises a step of maintaining a temperature within the mixing vessel to less than about 225° F. In some embodiments, the method comprises a step of cutting off a supply of an alumina-containing compound. In some embodiments, the method comprises a step of introducing a supply of an alumina-containing compound. In some embodiments, the method comprises a step of introducing water or a water solution into the vessel. In some embodiments, the method comprises a step of cutting off a supply of water or a water solution from the vessel. In some embodiments, the method comprises a step of introducing virgin sulfuric acid into the vessel. In some embodiments, the method comprises a step of cutting off a supply of virgin sulfuric acid from the vessel.

Figure 6:
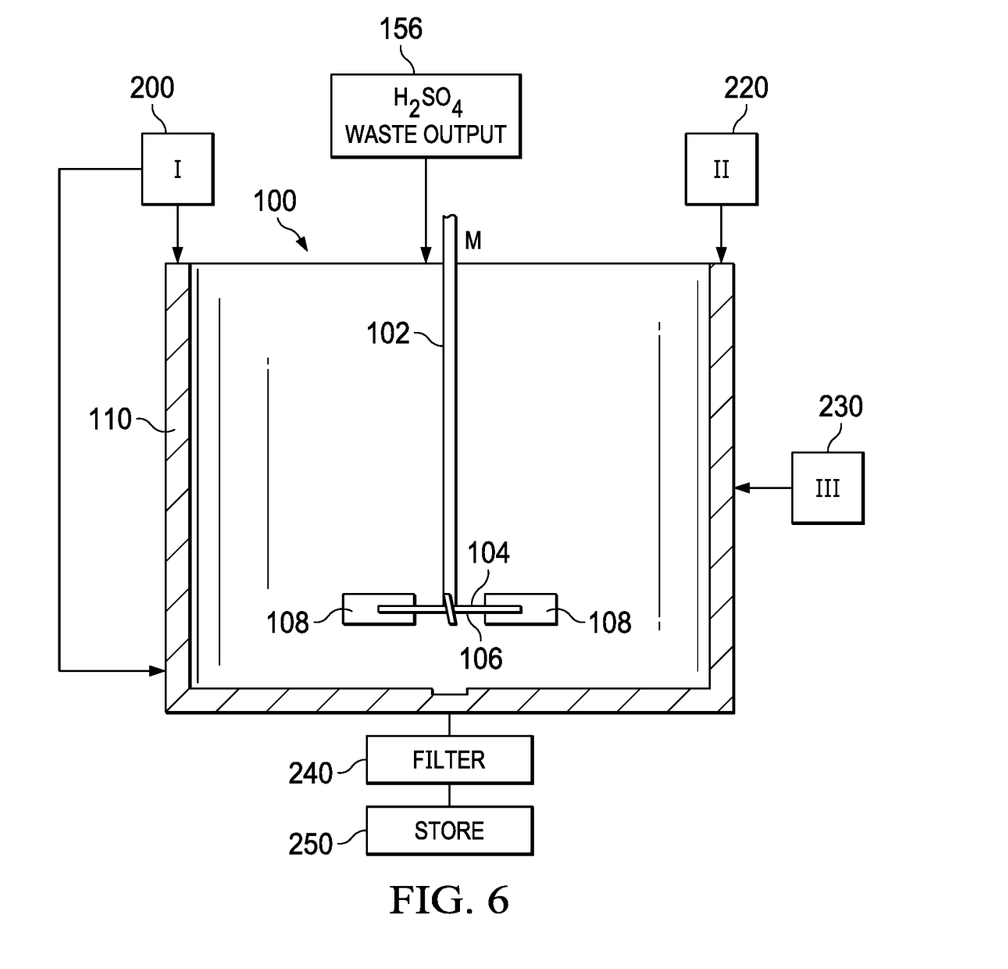
FIG. 6 depicts an embodiment of a system described herein.

FIG. 6 depicts a system for making aluminum sulfate from a sulfuric acid waste output of a manufacturing facility using the methods and mixing vessel 100 described above. A system of preparing liquid aluminum sulfate comprises a sulfuric waste output 156 of a manufacturing facility 152 in communication with a mixing vessel 100 at the manufacturing facility 152, said mixing vessel 100 comprising a rotatable shaft 102; an impeller 104 attached to the rotatable shaft 102; a motor connected to the rotatable shaft; a first tank 200 in communication with the mixing vessel, the first tank comprising a water solution; and a second tank 220 in communication with the mixing vessel, the second tank comprising an alumina-containing compound. In some embodiments, a supply source or tank in communication with the mixing vessel is in direct communication with the mixing vessel such that the system comprises no intervening step or structure prior to dispensing or supplying a substance into the mixing vessel. Thus, in some embodiments, the first tank is in direct communication with the mixing vessel. In some embodiments, the second tank is in direct communication with the mixing vessel. In some embodiments, the third tank is in direct communication with the mixing vessel. In some embodiments, a supply source or tank is in fluid communication with the mixing vessel. While FIG. 6 shows supply sources 156, 200, 220, and 230 in specific locations around the mixing vessel 100, their order is not limited to such positions so long as their respective contents are discharged into the inner diameter of the mixing vessel.

The first tank 200 may comprise a water solution source such as that of a city line or water well system in certain embodiments. In certain embodiments, at least the first tank or water solution source 200 is in communication with both a top half of the mixing vessel 100 and a bottom half of the mixing vessel 100. The top and bottom inlets providing for the adding of the water solution to adjust a temperature within the mixing vessel. In some embodiments, the system further comprises a third tank 230 in direct communication with the mixing vessel, the third tank comprising virgin sulfuric acid. Roman numeral III of FIG. 6 may also comprise a virgin sulfuric acid source.

Any number of pipes or pumps may be used to provide flow into an inner diameter of the mixing vessel. In some embodiments, the system comprises a thermometer or device for measuring the temperature of the solution within the mixing vessel. In some embodiments, the system comprises a thermometer or temperature-measuring system in communication with one or more of the vessel 100, sulfuric acid waste output 156, the water solution source 200, the alumina-containing compound 220, and a virgin sulfuric acid source 230. In some embodiments, a thermometer or temperature measuring system triggers the adding of an alumina-containing compound. In some embodiments, a thermometer or temperature measuring system triggers the adding of a water solution into the mixing vessel. A temperature measuring-system in communication with the vessel may also trigger the adding of virgin sulfuric acid to regulate the temperature for formation of the aluminum sulfate. The system described herein thus provides for a feedback loop system of preparing the aluminum sulfate from a sulfuric acid waste output. The feedback loop system is thus able to monitor the formation of the aluminum sulfate from a sulfuric acid waste output safely and efficiently. By way of example, the feedback loop system monitors the temperature of the mixing vessel to determine when to add an alumina-containing compound, communicates with a tank or source comprising an alumina-containing compound to add the alumina-containing compound, and adjusts the temperature within the vessel to between about 175° F. and about 225° F. by adding one or more of a water solution, virgin sulfuric acid, and sulfuric acid waste output. Formed aluminum sulfate comprises a clear color (i.e., colorless) in some embodiments.

Suitable embodiments of the sulfuric acid waste output, the water solution, and the alumina-containing compound are described above. In some embodiments, the sulfuric acid waste output is in direct communication with the mixing vessel following its production in a manufacturing process.

In some embodiments, the system further comprises a filter 240. In some embodiments, the system further comprises a storage system 250 for receiving the formed liquid aluminum sulfate. In some embodiments, the system comprises both a filter 240 and a storage system 250.

In some embodiments, the impeller is positioned within a bottom half of the mixing vessel 100. The shaft and impeller are generally described above with reference to FIGS. 2A, 2B, and 2C. The impeller comprises a plate 106 and a plurality of agitator blades 108 extending from the plate 106. Similar to FIG. 2A, FIG. 6 depicts only two of the four blades 108 for clarity. The plate 106 is connected or mounted perpendicular to the rotating shaft 102 in some embodiments. The plate may comprise a hole in its center for the shaft. The impeller may comprise an even number of agitator blades 108 in some embodiments. In certain embodiments, the blades are mounted at an angle extending from an upper left to a lower right. However, other designs may be possible so long as an axial flow is accomplished during mixing. In certain embodiments, the blades 108 may be mounted at an angle of between about 10° to about 80° with respect to the horizontal axis of the plate 106. In some embodiments, the blades 108 are mounted at an angle of between about 20° to about 70°. In some embodiments, the blades 108 are mounted at an angle of between about 30° to about 60°. In some embodiments, an even number of blades 108 are mounted at an angle of about 45° from the upper left to the lower right.

The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition is expressly set forth in the specification in a definitional manner that directly and unequivocally provides the special definition for the term or phrase.

The terms "including," "comprising," "having," and variations thereof mean "including but not limited to," unless expressly specified otherwise, and, therefore, allow the addition of other elements, components, steps, or parameters. The phrase "substantially comprises," and its variants, excludes additional material elements or components but allows for inclusions of non-material elements or components and trace impurities. When used in the appended claims, in original and amended form, the term "comprising" is intended to be inclusive or open-ended and does not exclude any additional, unrecited element, method, step or material. The term "consisting of" is closed and excludes any element, step or material other than those specified. As used herein, "up to" includes zero, meaning no amount (i.e, 0%) is added in some embodiments.

Unless otherwise specified, all percentages, parts and ratios refer to percentage, part, or ratio by weight of the total. For example, a percent or percentage refers to percent by weight, based on the total weight of the formulation or composition in which the component is included. Unless specifically set forth herein, the terms "a", "an", and "the" are not limited to one of such elements, but instead mean "at least one," unless otherwise specified. The term "about" as used herein refers to the precise values as subsequently indicated as well as to values that are within statistical variations or measuring inaccuracies. For example, phrases such as "between about X and about Y" or "between about X to about Y" should be interpreted to include X and Y.

The methods disclosed herein may be suitably practiced in the absence of any element, limitation, or step that is not specifically disclosed herein. Similarly, specific devices described herein may be free of any component not specifically described herein. Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. For example, the range 1 to 10 also incorporates reference to all rational numbers within that range (i.e., 1, 1.1, 2, 3, 3.9, 4, 5, 6, 6.5, 7, 8, 9 and 10) and also any range of rational numbers within that range (for example, 2 to 8, 1.5 to 5.5 and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

While the invention has been particularly shown and described with reference to certain embodiments, it will be understood by those skilled in the art that various changes in form and detail may be made therein without departing from the spirit and scope of the invention.

What is claimed is:

1. A method for processing a sulfuric acid waste output, the method comprising the steps of:
    providing a sulfuric acid waste output at a manufacturing facility; and
    feeding the sulfuric acid waste output into an onsite system of preparing aluminum sulfate at the manufacturing facility.

2. The method of claim 1 wherein the sulfuric acid waste output comprises no more than about 90% sulfuric acid.

3. The method of claim 1 wherein the feeding step comprises directing the sulfuric acid waste output directly into a vessel of the onsite system.

4. The method of claim 1 comprising a step of storing the sulfuric acid waste output onsite prior to the feeding step.

5. A method of preparing liquid aluminum sulfate, the method comprising the steps of:
    feeding a sulfuric acid waste output into a mixing vessel, the mixing vessel comprising access to a water solution;
    combining the water solution with the sulfuric acid waste output in the mixing vessel;
    mixing the water solution and the sulfuric acid waste output to form a mixed solution; and
    adding an alumina-containing compound to the mixed solution to form aluminum sulfate wherein the feeding step comprises piping the sulfuric acid waste output directly into the mixing vessel from a manufacturing process.

6. The method of claim 5 wherein the water solution comprises between about 10% and about 100% water.

7. The method of claim 5 wherein the sulfuric acid waste output consists of sulfuric acid, hydrogen peroxide and water prior to the combining step.

8. The method of claim 5 wherein the concentration of sulfuric acid of the mixed solution is between about 10% to about 85%.

9. The method of claim 5 wherein the alumina-containing compound comprises one of aluminum hydroxide and aluminum bauxite.

10. The method of claim 5 wherein the adding step is performed at a temperature of at least about 150° F.

11. The method of claim 5 comprising a step of storing the sulfuric acid waste output prior to the feeding step.

12. A system of preparing liquid aluminum sulfate, the system comprising:
    a sulfuric acid waste output of a manufacturing facility in communication with a mixing vessel at the manufacturing facility, said mixing vessel comprising a rotatable shaft;
    an impeller attached to the rotatable shaft;
    a motor connected to the rotatable shaft;
    a first tank in communication with the mixing vessel, the first tank comprising a water solution; and
    a second tank in communication with the mixing vessel, the second tank comprising an alumina-containing compound.

13. The system of claim 12 wherein the impeller is positioned within a bottom half of the mixing vessel.

14. The system of claim 12 wherein the sulfuric acid waste output comprises no more than about 90% sulfuric acid.

15. The system of claim 12 wherein the sulfuric acid waste output is in communication with the mixing vessel.

16. The system of claim 12 comprising a storage tank for receiving the sulfuric acid waste output, said storage tank in communication with the mixing vessel.

17. The system of claim 12 wherein water solution comprises between about 10% and about 100% water.

18. The system of claim 12 further comprising a third tank in communication with the mixing vessel, the third tank comprising virgin sulfuric acid.

19. The system of claim 12 wherein the alumina-containing compound comprises one of aluminum hydroxide and aluminum bauxite.

* * * * *